(12) United States Patent
Zywusko

(10) Patent No.: US 9,052,530 B2
(45) Date of Patent: Jun. 9, 2015

(54) EYEGLASS FRAME ASSEMBLY WITH SPRING BIASED NOSE PADS

(71) Applicant: Paul Zywusko, Laurel, MD (US)

(72) Inventor: Paul Zywusko, Laurel, MD (US)

( * ) Notice: Subject to any disclaimer, the term of this patent is extended or adjusted under 35 U.S.C. 154(b) by 42 days.

(21) Appl. No.: 13/934,700

(22) Filed: Jul. 3, 2013

(65) Prior Publication Data

US 2015/0009470 A1  Jan. 8, 2015

(51) Int. Cl.
*G02C 5/12* (2006.01)

(52) U.S. Cl.
CPC ...................................... *G02C 5/122* (2013.01)

(58) Field of Classification Search
USPC .......................... 351/71–73, 76, 78, 136–138
See application file for complete search history.

(56) References Cited

U.S. PATENT DOCUMENTS 6,158,860 A * 12/2000 Huang .......................... 351/136

* cited by examiner

*Primary Examiner* — Scott J Sugarman
*Assistant Examiner* — William R Alexander
(74) *Attorney, Agent, or Firm* — Berenato & White, LLC

(57) ABSTRACT

An eyeglass frame assembly comprises an eyeglass frame including a pin hole therein, which has a hole axis, and a nose rest assembly. The nose rest assembly includes a nose pad, a pin member longitudinally extending from the nose pad along a pin axis and a coil spring mounted about the pin member. The pin member is at least partially disposed in the pin hole so that the nose rest assembly is movable relative to the eyeglass frame along the hole axis between extended and retracted positions thereof. The coil spring biases the nose pad to the extended position thereof away from the pin hole.

18 Claims, 3 Drawing Sheets

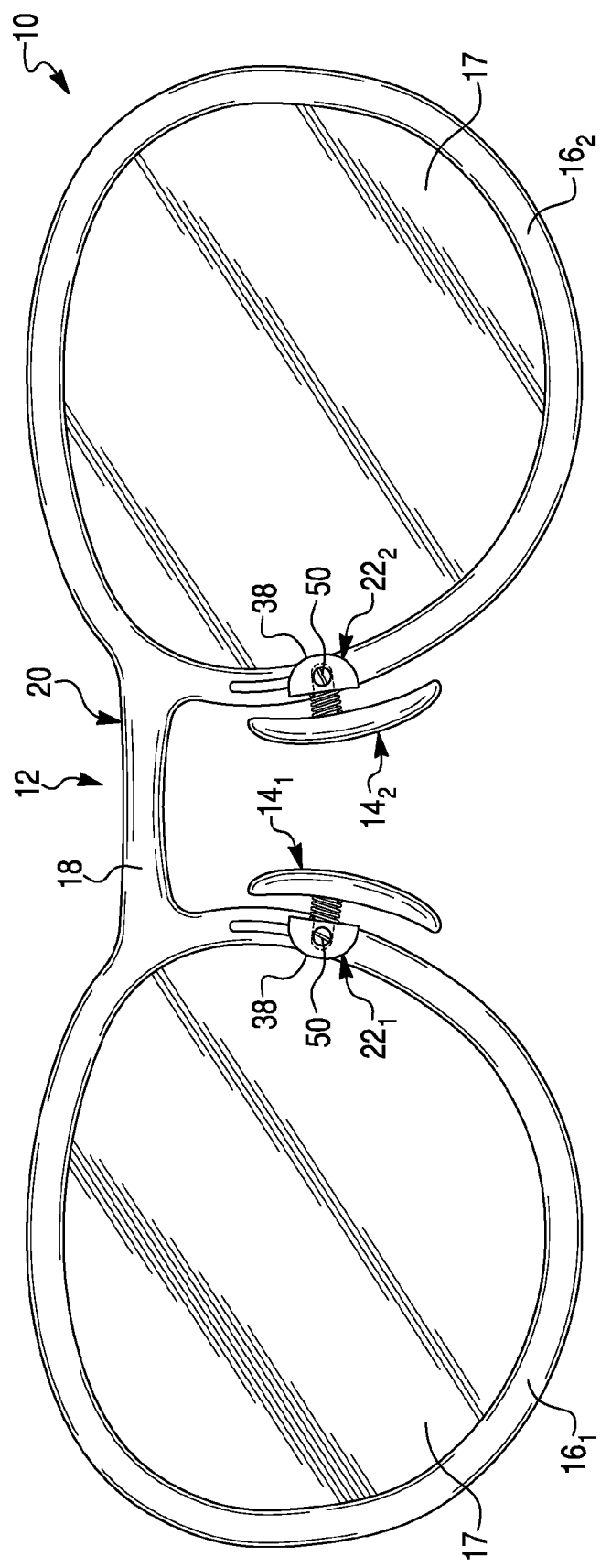

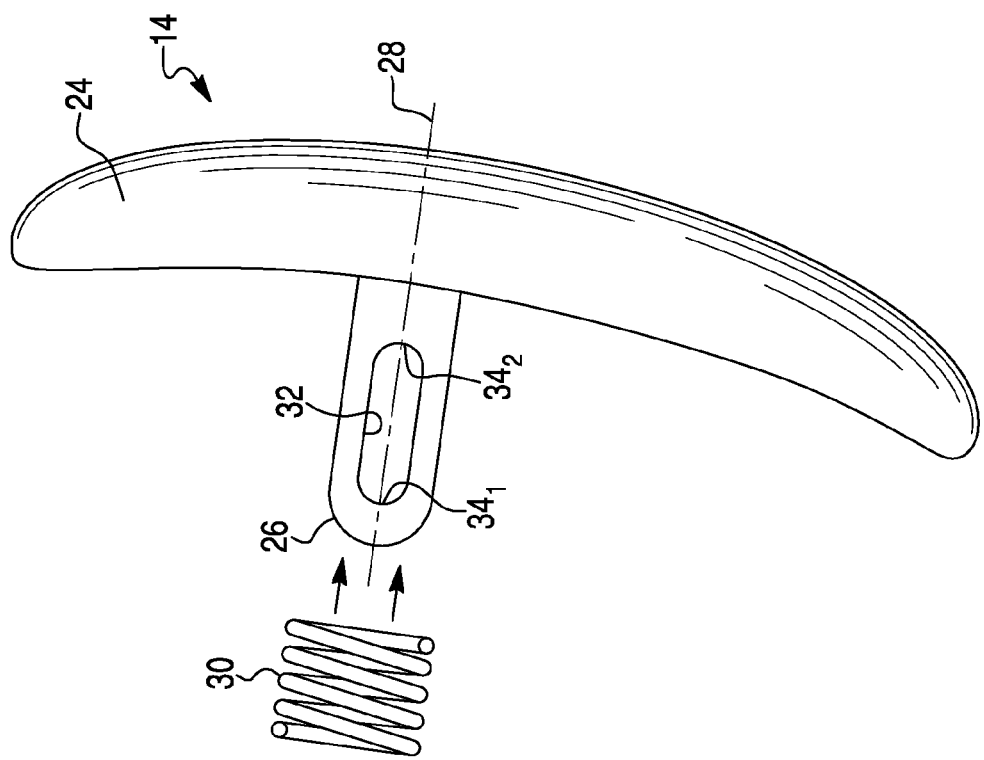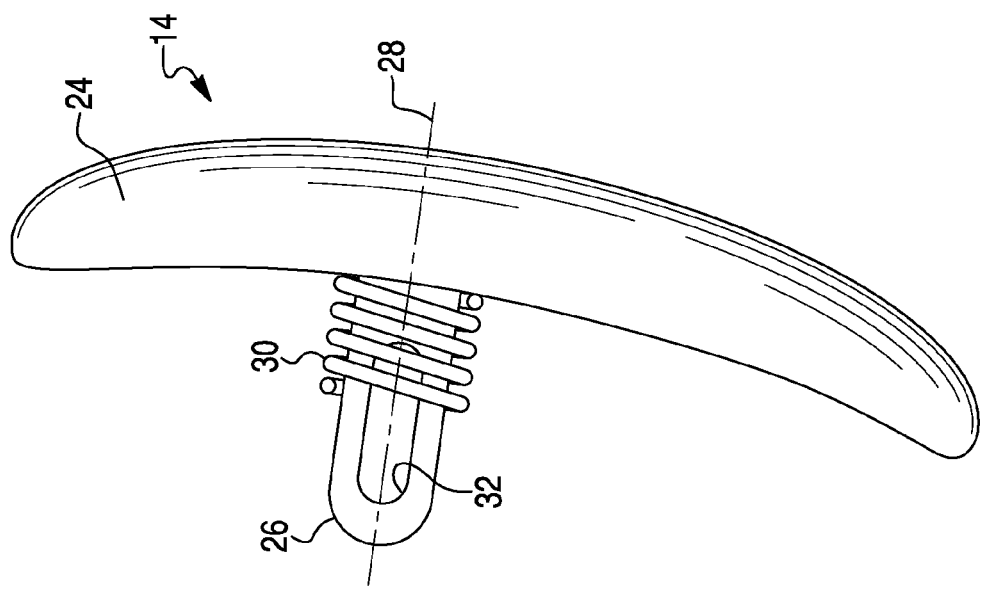

EYEGLASS FRAME ASSEMBLY WITH SPRING BIASED NOSE PADS

BACKGROUND OF THE INVENTION

1. Field of the Invention

The present invention relates to eyeglass frame assemblies in general and, more particularly, to an eyeglass frame assembly comprising an eyeglass frame and a spring biased nose rest assembly movable relative to the eyeglass frame.

2. Description of the Related Art

Conventional eyeglass frame assemblies include a pair of rims interconnected by a bridge member, and a pair of temples pivotally attached to the rims for hooking with user's ears. A pair of nose pads are arranged laterally apart on an inner side of two rims of the eyeglass frame for fixing eyeglass on user's nose. Typically, nose pads are connected to an eyeglass frame trough a bent wire arms welded on the eyeglass frame. The rigidity of the wire arms makes them practically inflexible so that the nose pads remain in the position set by an optician. In this position, the weight of the glasses frame is conveyed to sides of the wearer's nose via the wire arms and the nose pads. And depending on the thickness of the lens, eyeglasses can be quite heavy.

Although the rigidity of the wire arms is desirable for stability of the eyeglass frame, it has a disadvantage of being unsatisfactory in the event of a sudden, pulse-like pressure exerted on the glasses. In that case, the wire arms, because of their rigidity, will not yield until a certain pressure level is reached. This may be quite painful for the glasses wearer, because all the external force exerted is then transmitted, substantially un-dampened, to the sides of the nose via the nose pads. Because of relatively small bearing area of the nose pads, the result will be quite uncomfortable for the glass wearer.

Therefore, conventional eyeglass frame assemblies with rigidly connected nose pads are susceptible to improvements. With this in mind, a need exists to develop an eyeglass frame assembly with spring biased nose pads that advances the art.

SUMMARY OF THE INVENTION

The present invention is directed to an eyeglass frame assembly with a spring biased nose rest assembly movable relative to the eyeglass frame. The eyeglass frame assembly according to the present invention comprises an eyeglass frame having a pin hole therein, and a nose rest assembly. The pin hole has a hole axis. The nose rest assembly includes a nose pad, a pin member longitudinally extending from the nose pad along a pin axis and a coil spring mounted about said pin member. The pin member is at least partially disposed in the pin hole so that the nose rest assembly is movable relative to the eyeglass frame along the hole axis between extended and refracted positions thereof. The coil spring biases the nose pad to the extended position thereof away from the pin hole.

The eyeglass frame assembly according to the present invention has numerous advantages as compared to the existing eyeglass frame assemblies. Specifically, the eyeglass frame assembly of the present invention brings and allows more comfort to the eyeglass wearer by absorbing the weight of the eyeglass frame assembly on the nose of the eyeglass wearer, thus providing nose compression relief. The eyeglass frame assembly of the present invention is very easy to manufacture and assemble, thus making it cost effective.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein:

FIG. 1 is an eyeglass frame assembly according to an exemplary embodiment of the present invention;

FIG. 2 is a side view of a nose rest assembly according to the exemplary embodiment of the present invention;

FIG. 3 is an exploded view of the nose rest assembly according to the exemplary embodiment of the present invention;

DESCRIPTION OF EXEMPLARY EMBODIMENTS

Figure 4:
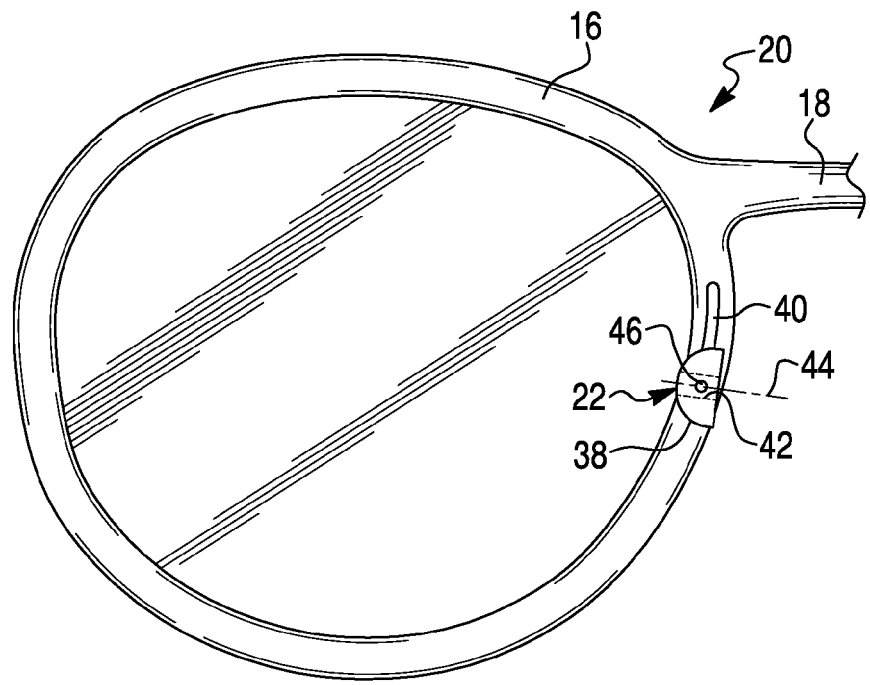
FIG. 4 is an enlarged sectional view of a nose pad support assembly according to the exemplary embodiment of the present invention.
Figure 5:
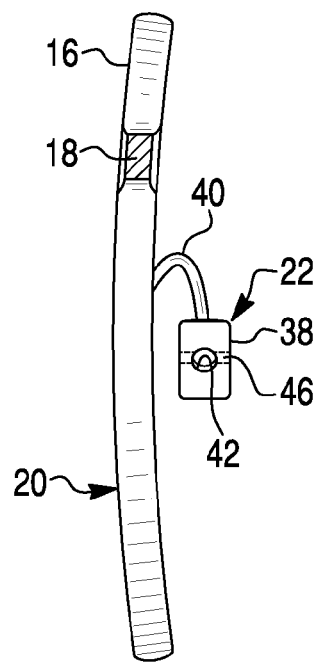
FIG. 5 is a front view of the nose pad support assembly according to the exemplary embodiment of the present invention.

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description.

In the description, relative terms such as "horizontal," "vertical," "up," "down," "upper", "lower", "right", "left", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the word "a" as used in the claims means "at least one" and the word "two" as used in the claims means "at least two".

The present invention is related to an eyeglass frame assembly generally denoted by reference numeral 10 according to an exemplary embodiment of the present invention shown in FIGS. 1-3. The eyeglass frame assembly 10 comprises an eyeglass frame 12 and first and second nose rest assemblies $14_1$ and $14_2$, each movably mounted to the eyeglass frame 12. The eyeglass frame 12 includes first and second rims $16_1$ and $16_2$, respectively, interconnected by a bridge member 18 so as to form a frame member 20, and first and second nose pad support assemblies $22_1$ and $22_2$, respectively, each attached to the frame member 20. Specifically, the first nose pad support assembly 22₁ is attached to the first rim 16₁, while the second nose pad support assembly 22₂ is attached to the second rim 16₂. Moreover, the first nose rest assembly 14₁ is movably mounted to the first nose pad support assembly 22₁, while the second nose rest assembly 14₂ is movably mounted to the second nose pad support assembly 22₂. Conventionally, the pair of rims 16₁ and 16₂ is adapted to hold a pair of lenses 17, and a pair of temples (not shown in FIG. 1) hingedly supported on the first and second rims 16₁ and 16₂.

According to the exemplary embodiment of the present invention, the first and second nose rest assemblies 14₁ and 14₂, the first and second rims 16₁ and 16₂ and the first and second nose pad support assemblies 22₁ and 22₂ are substantially identical. Alternatively, only one of the first and second nose rest assemblies 14₁ and 14₂, the first and second rims 16₁ and 16₂, and the first and second nose pad support assemblies 22₁ and 22₂ can be made according to the exemplary embodiment of the present invention.

In view of the structural similarities of the first and second nose rest assemblies 14₁ and 14₂, the first and second rims 16₁ and 16₂ and the first and second nose pad support assemblies 22₁ and 22₂ according to the exemplary embodiment of the present invention, and in the interest of simplicity, the following discussion will use a reference numeral without a letter to designate an entire group of substantially identical structures. For example, the reference numeral 14 will be used when generically referring to the second nose rest assemblies 14₁ and 14₂, the reference numeral 16 will be used when generically referring to the rims 16₁ and 16₂, while the reference numeral 22 will be used when generically referring to the nose pad support assemblies 22₁ and 22₂ rather than reciting all two reference numerals.

As best shown in FIG. 2, the nose rest assembly 14 according to the exemplary embodiment of the present invention comprises a nose pad 24 that rests on a side of a nose of a person wearing the eyeglass frame assembly 10, a pin member 26 longitudinally extending from the nose pad 24 along a pin axis 28, and a coil spring 30 mounted about the pin member 26 coaxially therewith and disposed between the nose pad 24 and the nose pad support assembly 22, as illustrated in FIG. 1. It will be appreciated that the coil spring 30 can be made of any appropriate material, such metal or metal alloys, composite, etc. As best shown in FIGS. 2 and 3, the pin member 26 is provided with an elongated slot 32 formed therein and extending along the pin axis 28 to allow relative displacement of the pin member 26 and hence displacement of the nose pad 24 relative to the frame member 20. The structure defining the elongated slot 32 has an elongated shape, with a straight (as shown in FIGS. 1-3) (or, alternatively, curved) side surface on each of two long sides, and opposite first and second stop surfaces 34₁ and 34₂, respectively, on each of distal ends of the elongated slot 32 along the pin axis 28 (best shown in FIGS. 2 and 3). According to the exemplary embodiment of the present invention, the nose pad 24 is integrally and non-movably attached to a proximal end of the pin member 26. Alternatively, the nose pad 24 is pivotally but axially non-movably attached to the proximal end of the pin member 26.

As best shown in FIG. 2, the nose pad support assembly 22 includes a nose pad support member 38 attached to the frame member 20 through a support arm 40. The support member 38 is provided with a pin hole 42 formed therein and having a hole axis 44. According to the exemplary embodiment of the present invention, the pin hole is in the form of an open end aperture extending through the nose pad support member 38 in the direction of the hole axis 44. The support member 38 is further provided with a support hole 46 formed therein. According to the exemplary embodiment of the present invention, the support hole 46 extends in the direction perpendicular to the hole axis 44 and, thus, perpendicular to the pin hole 42.

The pin hole 42 is sized to slideably receive therein the pin member 26 of the nose rest assembly 14 for displacement of the nose pad 24 therealong. When assembled, the pin hole 42 is coaxial with the pin member 26 of the nose rest assembly 14. In other words, when assembled, the pin axis 28 of the pin member 26 of the nose rest assembly 14 coincides with the hole axis 44 of the pin hole 42 of the nose pad support member 38. Accordingly, the pin member 26 of the nose rest assembly 14 is slideable in the pin hole 42 of the nose pad support member 38 along the hole axis 44. More specifically, the pin member 26 is at least partially disposed in the pin hole 42 so that the pin member 26 of the nose rest assembly 14 is reciprocatingly and linearly movable relative to the eyeglass frame 20 along the hole axis 44 between extended and retracted positions thereof.

The eyeglass frame assembly 10 further comprises a retaining pin 50 (shown in FIG. 1) attaching the nose rest assembly 14 to the nose pad support member 38. Moreover, the retaining pin 50 is secured to the nose pad support member 38 so as to extend through the elongated slot 32 in the pin member 26. Specifically, the retaining pin 50 is inserted in the support hole 46 of the nose pad support member 38 so as to extend through the elongated slot 32 in the pin member 26. Accordingly, the elongated slot 32 is sized to slideably receive the retaining pin 50 for displacement of the pin member 26 therealong. Moreover, the elongated slot 32 has a slot length substantially parallel to the direction of travel of the nose pad 24. Thus, the elongated slot 32 allows relative displacement of the pin member 26 and hence displacement of the nose pad 24 relative to the nose pad support member 38.

During the mounting of the nose rest assembly 14 to the nose pad support assembly 22, first, the pin member 26 is inserted into the pin hole 42 of the support member 38 so that the coil spring 30 is disposed outside the pin hole 42 between the nose pad 24 and the nose pad support member 38. Then, the coil spring 30 is slightly compressed and the retaining pin 50 is inserted into the support hole 46 of the nose pad support member 38 so as to extend through the elongated slot 32 in the pin member 26.

It should be understood that the coil spring 30 biases the nose pad 24 in an extended position thereof away from the nose pad support member 38 and the pin hole 42. The displacement of the pin member 26, thus the nose pad 24, is limited by the retaining pin 50 and the stop surfaces 34₁ and 34₂ of the elongated slot 32. Specifically, when either of the stop surfaces 34₁ and 34₂ of the elongated slot 32 of the pin member 26 reaches and engages the retaining pin 50, the pin member 26, thus the nose pad 24, is prevented from moving any further. For example, the nose pad 24 is in the extended position thereof when the first stop surface 34₁ of the elongated slot 32 of the pin member 26 reaches and engages the retaining pin 50. Similarly, the nose pad 24 is in a retracted position thereof when the second stop surface 34₂ of the elongated slot 32 of the pin member 26 reaches and engages the retaining pin 50. According to the exemplary embodiment of the present invention, the retaining pin 50 is in the form of an appropriate fastener, such as screw, bolt or rivet.

The eyeglass frame assembly according to the present invention has numerous advantages as compared to the existing eyeglass frame assemblies. Specifically, the eyeglass frame assembly according to the present invention pushes the gravity of the weight of the frame up off the bridge of the nose and back up into the frame. Consequently, the eyeglass frame assembly of the present invention brings and allows more comfort to the eyeglass wearer by absorbing the weight of the eyeglass frame assembly on the nose of the eyeglass wearer, thus providing nose compression relief. This will provide comfort and less fatigue for someone that has to wear glasses in all of their waking hours. The eyeglass frame assembly of the present invention is very easy to manufacture and assemble, thus making it cost effective.

The foregoing description of the exemplary embodiment(s) of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. An eyeglass frame assembly comprising:
   an eyeglass frame having a pin hole therein, said pin hole having a hole axis;
   a nose rest assembly including a nose pad, a pin member longitudinally extending from said nose pad along a pin axis and a coil spring mounted about said pin member; and
   a retaining pin attaching said nose rest assembly to said eyeglass frame;
   said pin member at least partially disposed in said pin hole so that said nose rest assembly is movable relative to said eyeglass frame along said hole axis between extended and retracted positions thereof;
   said coil spring biasing said nose pad to said extended position thereof away from said pin hole;
   said pin member having an elongated slot formed therein and extending along said pin axis;
   said retaining pin secured to said eyeglass frame so as to extend through said elongated slot in said pin member.

2. The eyeglass frame assembly according to claim 1, wherein said pin hole is coaxial with said pin member of said nose rest assembly.

3. The eyeglass frame assembly according to claim 1, wherein said coil spring is coaxial with said pin member of said nose rest assembly.

4. The eyeglass assembly according to claim 1, wherein said elongated slot having opposite first and second stop surfaces along said pin axis.

5. The eyeglass assembly according to claim 1, wherein said retaining pin extends in the direction perpendicular to said hole axis.

6. The eyeglass assembly according to claim 1, wherein said retaining pin in the form of a fastener.

7. The eyeglass frame assembly according to claim 1, wherein said eyeglass frame includes a support hole receiving said retaining pin therein.

8. The eyeglass assembly according to claim 7, wherein said support hole extends in the direction perpendicular to said hole axis.

9. The eyeglass assembly according to claim 8, wherein said retaining pin extends in the direction perpendicular to said hole axis.

10. The eyeglass assembly according to claim 1, wherein said coil spring is disposed between said nose pad and said eyeglass frame outside said pin hole of said eyeglass frame.

11. The eyeglass frame assembly according to claim 1, wherein said eyeglass frame includes a pair of rims interconnected by a bridge member so as to form a frame member, and a nose pad support member attached to said frame member; and wherein said pin hole is provided in said support member.

12. The eyeglass frame assembly according to claim 11, wherein said retaining pin in the form of a fastener.

13. The eyeglass frame assembly according to claim 11, wherein said support member includes a support hole receiving said retaining pin therein.

14. The eyeglass assembly according to claim 13, wherein said support hole extends in the direction perpendicular to said hole axis.

15. The eyeglass assembly according to claim 14, wherein said retaining pin extends in the direction perpendicular to said hole axis.

16. The eyeglass assembly according to claim 11, wherein said coil spring biases said nose rest assembly to the extended position thereof away from said support member of said eyeglass frame.

17. The eyeglass assembly according to claim 11, wherein said coil spring is disposed between said nose pad and said support member outside said pin hole of said support member.

18. An eyeglass frame assembly comprising:
   an eyeglass frame having a pin hole therein, said pin hole having a hole axis; and
   a nose rest assembly including a nose pad, a pin member longitudinally extending from said nose pad along a pin axis and a coil spring mounted about said pin member;
   said eyeglass frame including a pair of rims interconnected by a bridge member so as to form a frame member, and a nose pad support member provided with said pin hole and attached to said frame member;
   said pin member at least partially disposed in said pin hole so that said nose rest assembly is movable relative to said eyeglass frame along said hole axis between extended and retracted positions thereof;
   said coil spring biasing said nose pad to said extended position thereof away from said pin hole;
   said pin member having an elongated slot formed therein and extending along said pin axis;
   said eyeglass frame assembly further comprises a retaining pin attaching said nose rest assembly to said support member of said eyeglass frame, said retaining pin secured to said support member so as to extend through said elongated slot in said pin member in the direction perpendicular to said hole axis.

* * * * *